United States Patent
Brenner et al.

(10) Patent No.: US 8,206,872 B2
(45) Date of Patent: Jun. 26, 2012

(54) MITIGATION OF MEMBRANE DEGRADATION BY MULTILAYER ELECTRODE

(75) Inventors: Annette M. Brenner, Honeoye Falls, NY (US); Hubert A. Gasteiger, Rochester, NY (US); Wenbin Gu, Pittsford, NY (US); James Leistra, Penfield, NY (US); Brian A. Litteer, Henrietta, NY (US); Han Liu, Waltham, MA (US); Susan G. Yan, Fairport, NY (US); Jingxin Zhang, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1332 days.

(21) Appl. No.: 11/828,895

(22) Filed: Jul. 26, 2007

(65) Prior Publication Data

US 2009/0029235 A1 Jan. 29, 2009

(51) Int. Cl.
*H01M 8/10* (2006.01)
(52) U.S. Cl. .......... 429/481; 429/479; 429/483; 429/494
(58) Field of Classification Search .................... 429/483
See application file for complete search history.

(56) References Cited

U.S. PATENT DOCUMENTS

| | | | |
|---|---|---|---|
| 6,300,000 B1 | 10/2001 | Cavalca et al. | |
| 6,936,370 B1 * | 8/2005 | Knights et al. | 429/482 |
| 2003/0008196 A1 | 1/2003 | Wessel et al. | |
| 2004/0197627 A1 * | 10/2004 | Yan et al. | 429/30 |
| 2004/0224216 A1 | 11/2004 | Burlatsky et al. | |
| 2005/0008926 A1 | 1/2005 | Yamamoto | |
| 2006/0035123 A1 * | 2/2006 | Yoshida et al. | 429/26 |
| 2006/0127735 A1 * | 6/2006 | Sabin et al. | 429/35 |
| 2006/0280983 A1 * | 12/2006 | Kaneko et al. | 429/33 |
| 2007/0002052 A1 | 1/2007 | Van Koningsveld | |
| 2007/0020502 A1 * | 1/2007 | Cho et al. | 429/35 |

FOREIGN PATENT DOCUMENTS

EP 1 298 751 A2 4/2003

OTHER PUBLICATIONS

Mittal, V., Kunz, H., Fenton, J., "Is H2O2 Involved in the Membrane Degradation Mechanism in PEMFC?", Electrochemical and Solid-State Letters, 9 (6), A299-A302, 2006.

* cited by examiner

*Primary Examiner* — Ula C Ruddock
*Assistant Examiner* — Patricia Davis
(74) *Attorney, Agent, or Firm* — John A. Miller; Miller IP Group, PLC

(57) ABSTRACT

An MEA for a fuel cell that employs multiple catalyst layers to reduce the hydrogen and/or oxygen partial pressure at the membrane so as to reduce the fluoride release rate from the membrane and reduce membrane degradation. An anode side multi-layer catalyst configuration is positioned at the anode side of the MEA membrane. The anode side multi-layer catalyst configuration includes an anode side under layer positioned against the membrane and including a catalyst, an anode side middle layer positioned against the anode side under layer and not including a catalyst and an anode side catalyst layer positioned against the anode side middle layer and opposite to the anode side under layer and including a catalyst, where the amount of catalyst in the anode side catalyst layer is greater than the amount of catalyst in the anode side under layer.

17 Claims, 2 Drawing Sheets

MITIGATION OF MEMBRANE DEGRADATION BY MULTILAYER ELECTRODE

BACKGROUND OF THE INVENTION

1. Field of the Invention

This invention relates generally to an MEA for a fuel cell that includes a multi-layer catalyst configuration for decreasing the hydrogen and/or oxygen partial pressure at the cell membrane and, more particularly, to an MEA for a fuel cell that includes multiple catalyst layers on the anode side and/or cathode side of the cell membrane that reduces the hydrogen and oxygen partial pressure at the membrane so as to decrease membrane degradation.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane defines a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Hydrogen permeates through the membrane from the anode side to the cathode side and oxygen permeates through the membrane from the cathode side to the anode side of the fuel cells in the stack, often referred to as hydrogen cross-over and oxygen cross-over, respectively. The simultaneous presence of hydrogen, oxygen and catalyst (typically Pt or Pt/transition-metal alloys) leads to chemical degradation of the ion-conducting polymer in the membrane and in the electrodes. One of the proposed mechanisms to explain this phenomenon is that hydrogen and oxygen can react to generate hydrogen peroxide. The hydrogen peroxide reacts vigorously with ferric and/or ferrous ions present as impurities in the fuel cell components or are generated by corrosion of the bipolar plates. The reaction of hydrogen peroxide and ferrous ions produces hydroxyl free radicals, which degrade the membrane as a result of Fenton's reaction shown below.

$$H_2O_2 + Fe^{2+} \rightarrow Fe^{3+} + HO^- + HO^* \tag{1}$$

$$RH + OH^* \rightarrow R^* + H_2O \tag{2}$$

$$R^* + Fe^{3+} \rightarrow R^+ + Fe^{2+} \tag{3}$$

The degradation of the membrane produces primarily hydrogen fluoride in the fuel cell, referred to herein as a fluoride release rate from the membrane. The hydrogen fluoride corrodes stainless steel bipolar plates, which generates more ferric and ferrous ions, increasing the production of the hydroxyl free radicals, and thus further increasing the degradation of the membrane. This process thus becomes autocatalytic and a significant degradation of both the membrane and the bipolar plate occurs as a result of the reaction.

It has been discovered that decreasing the partial pressure of hydrogen on the anode side of the fuel cell and/or decreasing the oxygen partial pressure on the cathode side of the fuel cell decreases the fluoride release rate.

SUMMARY OF THE INVENTION

In accordance with the teachings of the present invention, an MEA for a fuel cell is disclosed that employs multiple catalyst layers to reduce the hydrogen and/or oxygen partial pressure at the membrane so as to reduce the fluoride release rate from the membrane and reduce membrane degradation. An anode side multi-layer catalyst configuration is provided at the anode side of the MEA. The anode side multi-layer configuration includes an anode side under layer positioned against the membrane and including a catalyst, an anode side middle layer positioned against the anode side under layer and not including a catalyst and an anode side catalyst layer positioned against the anode side middle layer and opposite to the anode side under layer and including a catalyst, where the amount of catalyst in the anode side catalyst layer is greater than the amount of catalyst in the anode side under layer.

The cathode side of the MEA can also include a cathode side multi-layer catalyst configuration having a cathode side under layer positioned against the membrane and including a catalyst, a cathode side middle layer positioned against the cathode side under layer and not including a catalyst and a cathode side catalyst layer positioned against the cathode side middle layer and opposite to the cathode side under layer and including a catalyst, where the amount of catalyst in the cathode side catalyst layer is greater than the amount of catalyst in the cathode side under layer.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an MEA for a fuel cell that includes multiple catalyst layers at one or both of the anode side and the cathode side of the membrane to reduce hydrogen and/or oxygen partial pressure at the membrane is merely exemplary in nature, and is in no way intended to limit the invention or its applications or uses.

Figure 1:
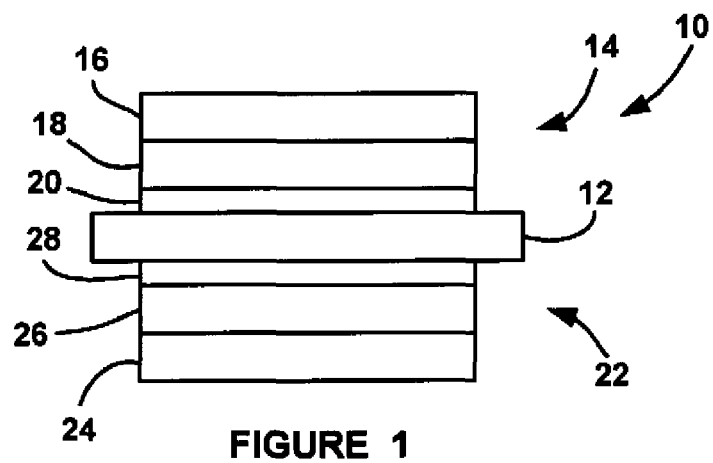
FIG. 1 is a plan view of an MEA for a fuel cell that includes a membrane and a plurality of catalyst layers at both the anode side and the cathode side of the membrane, where the catalyst layers reduce the hydrogen and oxygen partial pressure at the membrane, according to an embodiment of the present invention.

FIG. 1 is a plan view of an MEA 10 including a proton conducting membrane, such as perfluorosulfonic acid membrane 12, such as the commercially available Nafion® membrane. The MEA 10 would be part of a proton exchange membrane fuel cell of the type discussed above, and could be part of a fuel cell stack in a fuel cell system for a vehicle. According to the invention, the MEA 10 includes an anode side 14 having a catalyst layer 16, a middle layer 18 and an under layer 20. Likewise, a cathode side 22 of the MEA 10 includes a catalyst layer 24, a middle layer 26 and an under layer 28.

Conventional MEAs typically include a single catalyst layer at both the anode side and the cathode side having about 0.02 to 0.4 mg of an active hydrogen electro-oxidation catalyst per $cm^2$ MEA on the anode side (typically platinum, platinum metals or alloys thereof) and about 0.05 to 0.6 mg of an active oxygen electro-reduction catalyst per $cm^2$ on the cathode side (typically platinum, platinum metals, alloys thereof or platinum-metal transition-metal alloys). In this design, the partial pressure of the hydrogen at the catalyst layer/membrane interface at the anode side and the partial pressure of the oxygen at the catalyst layer/membrane interface at the cathode side would be almost 100%.

According to the invention, a desirable catalyst loading is maintained at the anode side 14 and the cathode side 22 of the membrane 12 while significantly reducing the partial pressure of the hydrogen at the interface of the under layer 20 and the membrane 12 and the partial pressure of oxygen at the interface of the under layer 28 and the membrane 12. Particularly, the catalyst layers 16 and 24 include significant catalyst loading, the middle layers 18 and 26 do not include any catalyst and the under layers 20 and 28 include a minimal amount of catalyst loading. In one non-limiting example, the catalyst loading of the catalyst layers 16 and 24 is in the range of 0.01 to 0.40 mg of platinum per $cm^2$ and the catalyst loading of the under layers 20 and 28 is in the range of 0.005 to 0.20 mg of platinum per $cm^2$.

The middle layers 18 and 26 can be a non-porous or low-porosity layer or mixture of ionomer and carbon, or any other suitable material that conducts protons and electrons, where the hydrogen and oxygen permeability of these layers is desired to be low compared to the anode and cathode catalyst layers 16 and 24. The carbon can be the commercially available Ketjen, Vulcan, black pearls or any other high-surface area carbon blacks known in the art. Alternatively, any other combination of electron conducting material and proton conducting material may be used.

The cathode side under layer 20 and the anode side under layer 28 can include carbon black and sulfonic acid based ionomers and have an ionomer to carbon weight ratios of 2/1 to 6/1 and an overall thickness in the range of 1-10 micrometers.

The layers 16-20 and 24-28 can have any thickness suitable for the purposes described herein. In one non-limiting embodiment, the catalyst layers 16 and 24 are about 6 μm thick, the middle layers 18 and 26 are about 5 μm thick and the under layers 20 and 28 are about 3 μm thick. The total thickness of the catalyst layers 16 and 24, the middle layers 18 and 26 and the under layers 20 and 28 would be about the same as the single catalyst layer in the known MEAs.

Owing to the low hydrogen permeability of the middle layer 18 on the anode side and the low oxygen permeability of the middle layer 26 on the cathode side, significant reduction of hydrogen permeation into the membrane 12 can be accomplished by small amounts of hydrogen electro-oxidation catalyst in the anode under layer 20 and significant reduction of oxygen permeation into the membrane 12 can be accomplished by small amounts of oxygen electro-reduction catalyst in the cathode under layer 28. Therefore, owing to the low hydrogen and oxygen permeability of the middle layer 18 on the anode middle layer 18 and the middle layer 26 in the cathode side, respectfully, the amount of catalyst in the under layers 20 and 28 is significantly reduced over what was proposed previously for a configuration that does not have the low gas permeability middle layers 18 and 26. This way, the total catalyst loading of the anode in the electrode 16 and the under layer 20, as well as the cathode in the electrode 24 and the under layer 28 can be reduced substantially by the introduction of the catalyst-free middle layers 18 and 26, thus reducing MEA cost.

The anode hydrogen reactant gas from the anode flow channels (not shown) in the fuel cell propagates through a diffusion media layer (not shown) to the catalyst layer 16. The hydrogen is oxidized in the catalyst layer 16 and generates protons and electrons, where the protons propagate through the middle layer 18, the under layer 20 and the membrane 12 and the electrons pass through an external circuit (not shown) to the cathode side 22. The hydrogen that does not get reacted in the catalyst layer 16 propagates through the low hydrogen permeability middle layer 18, where its partial pressure is reduced as it travels across the non-porous middle layer 18 with low hydrogen permeability, to the non-porous under layer 20 where it has another opportunity to be converted to protons and electrons. The hydrogen that reaches the membrane 12 will be minimal, and thus, the partial pressure of hydrogen at the membrane interface is significantly reduced, Protons propagate through the membrane 12. The protons react with oxygen in the air and the electrons that travel through the external circuit to generate water. Air is provided from cathode reactant gas flow channels (not shown) through a diffusion media layer (not shown) to the catalyst layer 24, where most of the reaction takes place that generates water.

The oxygen that does not get reacted in the catalyst layer 24 propagates through the low oxygen permeability middle layer 26, where its partial pressure is reduced as it travels across the non-porous low oxygen permeability middle layer 26, to the non-porous under layer 20 where it has another opportunity to be reacted with protons and electrons to generate water. The oxygen that reaches the membrane 12 will be minimal, and thus, the partial pressure of oxygen at the membrane interface is significantly reduced.

Figure 2:
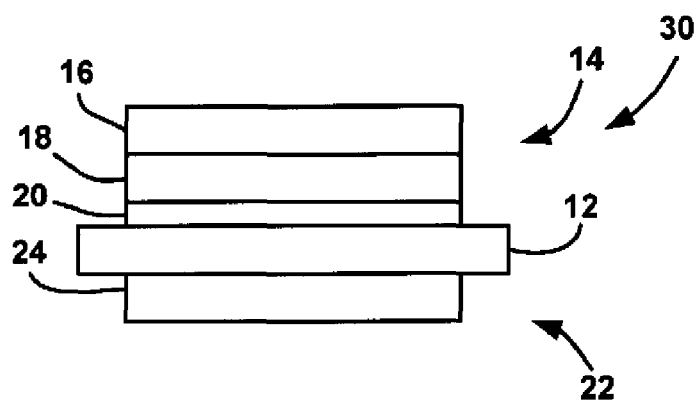
FIG. 2 is a plan view of an MEA for a fuel cell that includes a membrane and a plurality of catalyst layers at the anode side of the membrane, where the catalyst layers reduce the hydrogen partial pressure at the membrane, according to an embodiment of the present invention.

Although both the anode side 14 and the cathode side 22 have the three layers in the embodiment discussed above, it may be desirable to only use a three catalyst layer configuration on one of either the anode side 14 or the cathode side 22 to reduce system costs. FIG. 2 is a plan view of an MEA 30 where only the anode side 14 includes the catalyst multi-layer configuration. On the cathode side 22, the middle layer 26 and the under layer 28 have been eliminated, where the catalyst layer 24 is positioned against the membrane 12. As discussed above, the amount of hydrogen at the interface between the under layer 20 and the membrane 12 is significantly reduced, which significantly reduces membrane degradation. Therefore, it may not be necessary to provide the catalyst multi-layer configuration on the cathode side 22 of the MEA 30 to get the desired lifetime out of the fuel cell.

Figure 3:
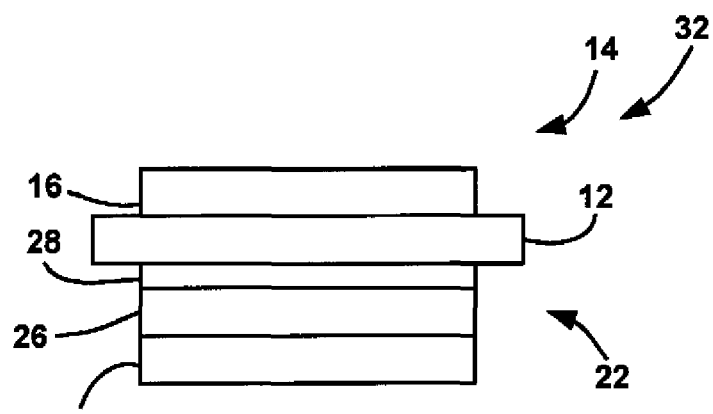
FIG. 3 is a plan view of an MEA for a fuel cell that includes a membrane and a plurality of catalyst layers at the cathode side of the membrane, where the catalyst layers reduce the oxygen partial pressure at the membrane, according to another embodiment of the present invention.

FIG. 3 is a plan view of an MEA 32 that includes the catalyst multi-layer configuration on the cathode side 22 as discussed above. In this embodiment, the middle layer 18 and the under layer 20 have been eliminated from the anode side 14, and the catalyst layer 16 is positioned adjacent to the membrane 12. Because the partial pressure of oxygen at the interface between the membrane 12 and the under layer 28 is significantly reduced, reducing the membrane degradation, it may not be necessary to include the catalyst multi-layer configuration on the anode side to meet the lifetime goals of the MEA.

Figure 4:
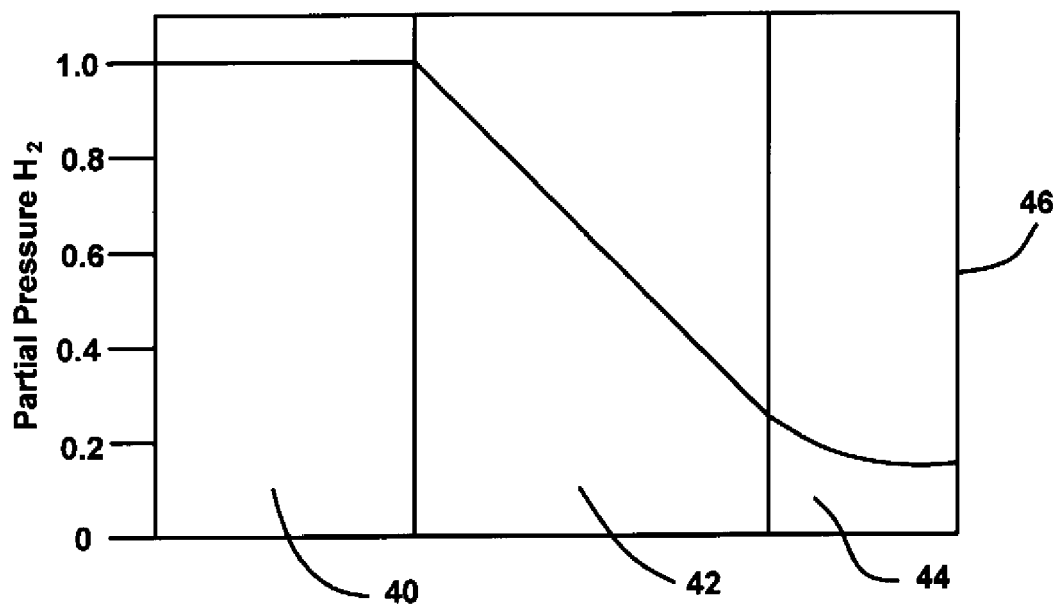
FIG. 4 is a graph with the position of the catalyst layers at the anode side of the MEA shown in FIG. 1 on the horizontal axis and the partial pressure of hydrogen on the vertical axis.

By providing only catalyst multi-layers on the anode side 22, the partial pressure of hydrogen can be decreased by almost 82% at the anode side under layer/membrane interface. FIG. 4 is a graph where the catalyst layer 16 (at a loading of 0.05 $mg_{Pt}/cm^2$ in this example), the middle layer 18 and the under layer 20 (at a loading of 0.01 mg $mg_{Pt}/cm^2$ in this example) are represented as sections 40, 42 and 44, respectively, and where the line 46 represents the interface between the under layer 20 and the membrane 12. The partial pressure of hydrogen is shown on the vertical axis. As is shown by this graph, at a stack current density of 20 mA/cm² and an under layer having a catalyst loading of 0.01 mg platinum per cm², the partial pressure of hydrogen at the interface of the catalyst layer section 40 and the middle layer section 42 is slightly less than 100% and the partial pressure of hydrogen at the interface of the under layer section 44 and the membrane 12 is less than 20%, providing a decrease in the partial pressure of about 82%. For the prior art without the use of a middle layer, the hydrogen partial pressure at the membrane 12 is only reduced by 26% (compared to 82%), which is less effective in reducing chemical degradation. The superior performance of the newly proposed middle layer is due to its low hydrogen permeability, which lowers the flux of hydrogen to the under layer 20, thereby reducing the total amount of hydrogen oxidation catalyst required for the under layer 20 if compared to the prior art. As the current density of the fuel cell stack increases, the partial pressure at the interface of the anode side under layer 20 and the membrane 12 will further decrease.

Figure 5:
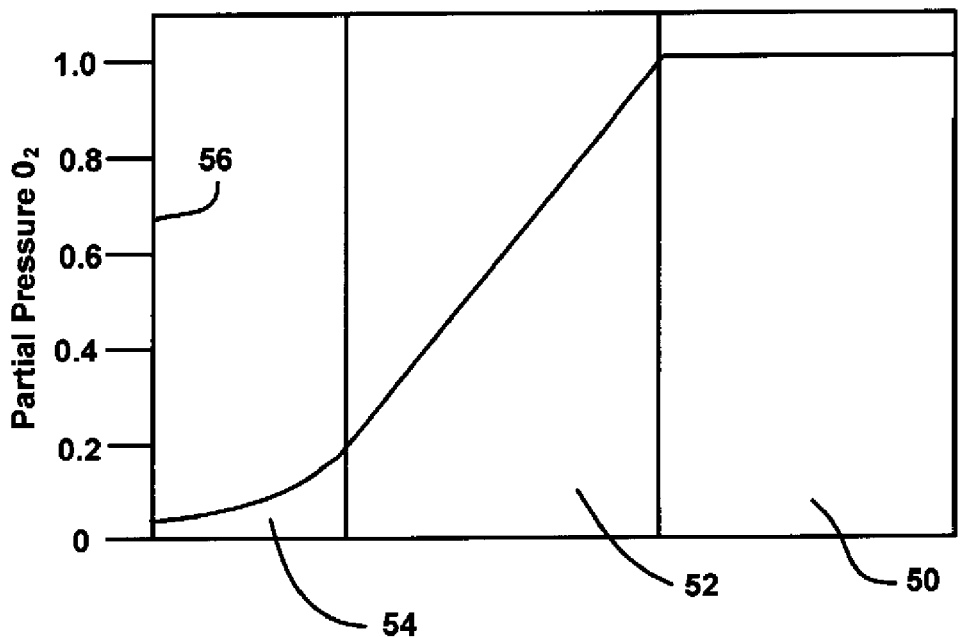
FIG. 5 is a graph with the position of the catalyst layers at the cathode side of the MEA shown in FIG. 1 on the horizontal axis and the partial pressure of oxygen on the vertical axis.

By providing only multilayers on the cathode side 22, the partial pressure of oxygen can be decreased by about 97% at the cathode side under layer/membrane interface. FIG. 5 is a graph where the catalyst layer 24 (at a loading of 0.20 $mg_{Pt}/cm^2$ in this example), the middle layer 26 and the under layer 28 (at a loading of 0.02 $mg_{Pt}/cm^2$ in this example) are represented as sections 50, 52 and 54, respectively, and where the line 56 represents the interface between the under layer 28 and the membrane 12. The partial pressure of oxygen is shown on the vertical axis. As is shown by this graph, at a stack current density of 20 mA/cm² and an under layer having a catalyst loading of 0.02 mg platinum per cm², the partial pressure of oxygen at the interface between the catalyst layer section 50 and the middle layer section 52 is slightly less than 100% and the partial pressure of oxygen at the interface of the under layer section 54 and the membrane 12 is less than 3%, providing a decrease in the partial pressure of about 97%. For the prior art without use of a middle layer, the oxygen partial pressure at the membrane 12 is only reduced by 73% (compared to 97%), which is therefore less effective in reducing chemical degradation. The superior performance of the newly proposed middle layer is due to its low oxygen permeability, which lowers the flux of oxygen to the under layer 28, thereby reducing the total amount of oxygen reduction catalyst required for the under layer 28 compared to the prior art. As the current density of the fuel cell stack increases, the partial pressure at the interface of the anode side under layer 20 and the membrane 12 will further decrease.

The present invention proposes using a middle layer of ionomer and carbon composite that is non-porous to decrease the hydrogen and/or oxygen partial pressure to a level lower than with just an under layer at a particular target loading of platinum. This will result in an increased life through the reduction in fluoride release rate. Catalyst loadings and catalyst costs would decrease as a result of using low gas permeability middle layers between the two catalyst layers compared to the prior art configuration without a middle layer.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A membrane electrode assembly (MEA) comprising:
an ion-conducting membrane including an anode side and a cathode side;
at least one catalyst side catalyst layer positioned at the cathode side of the membrane; and
an anode side multi-layer catalyst configuration positioned at the anode side of the membrane, said anode side multilayer catalyst configuration including an anode side under layer positioned against the membrane and including a catalyst, an anode side middle layer positioned against the anode side under layer and not including a catalyst and an anode side catalyst layer positioned against the anode side middle layer and opposite to the anode side under layer and including a catalyst, where the amount of catalyst in the anode side catalyst layer is greater than the amount of catalyst in the anode side under layer and where the anode side middle layer is a low hydrogen permeability non-porous layer of an electron conductive material and ion conducting polymer.

2. The MEA according to claim 1 wherein the membrane is a proton conducting membrane, and wherein the anode side multi-layer configuration reduces the chemical membrane degradation rate by reducing the partial pressure of hydrogen at an interface of the anode side under layer and the membrane.

3. The MEA according to claim 1 wherein the anode side under layer has about 0.005 to 0.20 mg of catalyst per $cm^2$ and the anode side catalyst layer has 0.01 to 0.40 mg of catalyst per $cm^2$.

4. The MEA according to claim 1 wherein the anode side under layer includes carbon black and sulfonic acid based ionomers at ionomer to carbon weight ratios of 2/1 to 6/1 and an overall thickness in the range of 1-10 micrometers.

5. The MEA according to claim 1 wherein the catalyst is selected from the group consisting of platinum, platinum-metal, platinum-metal alloys and platinum-metal-transition-metal alloys.

6. The MEA according to claim 1 wherein the at least one catalyst layer positioned at the cathode side of the membrane includes a cathode side multi-layer catalyst configuration, said cathode side multilayer catalyst configuration including an cathode side under layer positioned against the membrane and including a catalyst, a cathode side middle layer positioned against the cathode side under layer and not including a catalyst and a cathode side catalyst layer positioned against the cathode side middle layer and opposite to the cathode side under layer and including a catalyst, where the amount of catalyst in the cathode side catalyst layer is greater than the amount of catalyst in the cathode side under layer.

7. The MEA according to claim 6 wherein the cathode side under layer has about 0.005 to 0.20 mg of catalyst per $cm^2$ and the cathode side catalyst layer has 0.01 to 0.40 mg of catalyst per $cm^2$.

8. The MEA according to claim 6 wherein the cathode side middle layer is a low hydrogen permeability non-porous layer of an electron conductive material and ion conducting polymer.

9. The MEA according to claim 6 wherein the cathode side under layer includes carbon black and sulfonic acid based ionomers at ionomer to carbon weight ratios of 2/1 to 6/1 and an overall thickness in the range of 1-10 micrometers.

10. The MEA according to claim 1 wherein the MEA is part of a fuel cell that is part of a fuel cell stack that is part of a fuel cell system on a vehicle.

11. A membrane electrode assembly (MEA) comprising:
an ion-conducting membrane including an anode side and a cathode side;
a cathode side multi-layer catalyst configuration, said cathode side multilayer catalyst configuration including an cathode side under layer positioned against the membrane and including a catalyst, a cathode side middle layer positioned against the cathode side under layer and not including a catalyst and a cathode side catalyst layer positioned against the cathode side middle layer and opposite to the cathode side under layer and including a catalyst, where the amount of catalyst in the cathode side catalyst layer is greater than the amount of catalyst in the cathode side under layer; and
at least one anode side catalyst layer positioned at the cathode side of the membrane wherein the cathode side middle layer is a low hydrogen permeability non-pours layer of an electron conductive material and ion conducting polymer.

12. The MEA according to claim 11 wherein the membrane is a proton-conducting membrane, and wherein the cathode side multi-layer configuration reduces the chemical membrane degradation rate by reducing the partial pressure of oxygen at an interface of the cathode side under layer and the membrane.

13. The MEA according to claim 11 wherein the cathode side under layer has about 0.005 to 0.20 mg of catalyst per $cm^2$ and the cathode side catalyst layer has 0.01 to 0.40 mg of catalyst per $cm^2$.

14. The MEA according to claim 11 wherein the cathode side under layer includes carbon black and sulfonic acid based ionomers at ionomer to carbon weight ratios of 2/1 to 6/1 and an overall thickness in the range of 1-10 micrometers.

15. The MEA according to claim 11 wherein the catalyst is selected from the group consisting of platinum, platinum-metal, platinum-metal alloys and platinum-metal-transition-metal alloys.

16. A membrane electrode assembly (MEA) comprising:
an ion-conducting membrane including an anode side and a cathode side;
a cathode side multi-layer catalyst configuration, said cathode side multilayer catalyst configuration including an cathode side under layer positioned against the membrane and including a catalyst, a cathode side low oxygen permeability middle layer positioned against the cathode side under layer and not including a catalyst and a cathode side catalyst layer positioned against the cathode side middle layer and opposite to the cathode side under layer and including a catalyst, where the amount of catalyst in the cathode side catalyst layer is greater than the amount of catalyst in the cathode side under layer; and
an anode side multi-layer catalyst configuration positioned at the anode side of the membrane, said anode side multilayer catalyst configuration including an anode side under layer positioned against the membrane and including a catalyst, an anode side low hydrogen permeability middle layer positioned against the anode side under layer and not including a catalyst and an anode side catalyst layer positioned against the anode side middle layer and opposite to the anode side under layer and including a catalyst, where the amount of catalyst in the anode side catalyst layer is greater than the amount of catalyst in the anode side under layer, wherein the catalyst is platinum wherein the cathode side and anode side middle layers are non-porous layers of carbon and ionomer composite.

17. The MEA according to claim 1 wherein the cathode and anode side under layers have about 0.005 to 0.20 mg of catalyst per $cm^2$ and the cathode and anode side catalyst layers have 0.01 to 0.40 mg of catalyst per $cm^2$.

* * * * *